(12) United States Patent
Hurst et al.

(10) Patent No.: US 10,808,846 B1
(45) Date of Patent: Oct. 20, 2020

(54) PUMP PLUNGER WITH WRENCH FEATURES

(71) Applicant: Halliburton Energy Services, Inc., Houston, TX (US)

(72) Inventors: Justin Lee Hurst, Healdton, OK (US); James Alan Olis, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/411,905

(22) Filed: May 14, 2019

(51) Int. Cl.
*F04B 1/0404* (2020.01)
*F04B 53/22* (2006.01)
*F16K 3/02* (2006.01)
*F04B 1/0452* (2020.01)
*F04B 53/10* (2006.01)
*F04B 53/16* (2006.01)

(52) U.S. Cl.
CPC .......... *F16K 3/0272* (2013.01); *F04B 1/0452* (2013.01); *F04B 53/1087* (2013.01); *F04B 53/16* (2013.01)

(58) Field of Classification Search
CPC ...................................... F04B 53/16
USPC ....................................... 166/373
See application file for complete search history.

(56) References Cited

U.S. PATENT DOCUMENTS

| 3,299,417 A | 1/1967 | Sibthorpe |
| 3,459,363 A | 8/1969 | Miller |
| 3,516,434 A | 6/1970 | Noss |
| 3,664,371 A | 5/1972 | Schneider |
| 4,341,235 A | 7/1982 | Nord |
| 4,784,588 A | 11/1988 | Miyashita et al. |
| 4,850,392 A | 7/1989 | Crump et al. |
| 4,939,923 A | 7/1990 | Sharp |
| 5,040,408 A | 8/1991 | Webb |
| 5,072,622 A | 12/1991 | Roach et al. |
| 5,176,025 A | 1/1993 | Butts |

(Continued)

FOREIGN PATENT DOCUMENTS

EP  0580196 A1  1/1994

OTHER PUBLICATIONS

Acknowledgement receipt and specification for patent application entitled "Pump Fluid End with Suction Valve Closure Assist," by Justin L. Hurst, et al., filed Jun. 10, 2019 as U.S. Appl. No. 16/436,312.

(Continued)

*Primary Examiner* — Taras P Bemko
(74) *Attorney, Agent, or Firm* — Conley Rose, P.C.; Rodney B. Carroll

(57) ABSTRACT

A reciprocating element includes a cylindrical body having a front end opposite a tail end, and a central axis. The tail end of the cylindrical body is configured to be operatively connected to a pump power end that reciprocates the reciprocating element along a path within a bore of a pump fluid end during operation of a pump. The front end of the cylindrical body includes one or more tool engagement features positioned about an outer circumference of the front end of the cylindrical body of the reciprocating element and adapted to engage a corresponding one or more reciprocating element engagement features of a reciprocating element end of a tool. The reciprocating element can be rotated, pulled, and/or pushed via the tool relative to the central axis of the cylindrical body.

19 Claims, 9 Drawing Sheets

(56) References Cited

U.S. PATENT DOCUMENTS

| | | | |
|---|---|---|---|
| 5,343,738 | A | 9/1994 | Skaggs |
| 5,403,168 | A | 4/1995 | Evenson |
| 5,720,325 | A | 2/1998 | Grantham |
| 5,890,415 | A | 4/1999 | Asou |
| 5,924,853 | A | 7/1999 | Pacht |
| 6,032,699 | A | 3/2000 | Cochran et al. |
| 6,082,392 | A | 7/2000 | Watkins, Jr. |
| 6,164,188 | A | 12/2000 | Miser |
| 6,342,272 | B1 | 1/2002 | Halliwell |
| 6,607,010 | B1 | 8/2003 | Kashy |
| 6,935,161 | B2 | 8/2005 | Hutchinson |
| 7,798,165 | B2 | 9/2010 | McClung, Jr. |
| 8,234,911 | B2 | 8/2012 | Jax |
| 8,366,408 | B2 | 2/2013 | Wago et al. |
| 8,418,363 | B2 | 4/2013 | Patel |
| 8,506,262 | B2 | 8/2013 | Leugemors et al. |
| 8,550,102 | B2 | 10/2013 | Small |
| 8,590,614 | B2 | 11/2013 | Surjaatmadja et al. |
| 9,115,564 | B1 | 8/2015 | Villines |
| 9,499,895 | B2 | 11/2016 | Langan et al. |
| 9,528,508 | B2 | 12/2016 | Thomeer et al. |
| 9,617,654 | B2 | 4/2017 | Rajagopalan et al. |
| 9,822,894 | B2 | 11/2017 | Bayyouk et al. |
| 2004/0025648 | A1* | 2/2004 | Po .................. B25B 27/0035 81/176.1 |
| 2007/0044848 | A1 | 3/2007 | Norman |
| 2007/0267076 | A1 | 11/2007 | Strauss et al. |
| 2008/0011057 | A1 | 1/2008 | Spaolonzi et al. |
| 2009/0041588 | A1 | 2/2009 | Hunter et al. |
| 2009/0041596 | A1 | 2/2009 | Ponomarev et al. |
| 2009/0159133 | A1 | 6/2009 | Popke et al. |
| 2009/0194174 | A1 | 8/2009 | Morgan et al. |
| 2009/0278069 | A1 | 11/2009 | Blanco et al. |
| 2010/0098568 | A1 | 4/2010 | Marica |
| 2010/0126250 | A1 | 5/2010 | Jax |
| 2010/0325888 | A1 | 12/2010 | Hawes |
| 2011/0162187 | A1* | 7/2011 | Patel .................. F04B 23/00 29/428 |
| 2011/0180740 | A1 | 7/2011 | Marica |
| 2012/0148431 | A1 | 6/2012 | Gabriel |
| 2012/0223267 | A1 | 9/2012 | Marica |
| 2012/0279721 | A1 | 11/2012 | Surjaatmadja et al. |
| 2012/0312402 | A1 | 12/2012 | Tyler |
| 2013/0061942 | A1 | 3/2013 | Hulsey |
| 2013/0319220 | A1 | 12/2013 | Lahuraka et al. |
| 2014/0064996 | A1 | 3/2014 | Arima |
| 2014/0150889 | A1 | 6/2014 | Ragner |
| 2014/0261790 | A1 | 9/2014 | Marica |
| 2014/0312257 | A1 | 10/2014 | Marica |
| 2014/0328701 | A1 | 11/2014 | Nathan |
| 2014/0348677 | A1 | 11/2014 | Moeller et al. |
| 2015/0132157 | A1 | 5/2015 | Whaley et al. |
| 2016/0040524 | A1* | 2/2016 | Ravi .................. E21B 47/0005 166/253.1 |
| 2016/0131264 | A1 | 5/2016 | Bregazzi et al. |
| 2016/0215588 | A1 | 7/2016 | Belshan et al. |
| 2018/0058431 | A1 | 3/2018 | Blume |
| 2018/0058444 | A1 | 3/2018 | Blume |
| 2018/0298894 | A1 | 10/2018 | Wagner et al. |
| 2019/0120389 | A1 | 4/2019 | Foster et al. |
| 2019/0226475 | A1 | 7/2019 | Stark et al. |

OTHER PUBLICATIONS

Acknowledgement receipt and specification for patent application entitled "Multi-Material Frac Valve Poppet," by Jim B. Surjaatmadja, et al., filed Jun. 10, 2019 as U.S. Appl. No. 16/436,356.

Acknowledgement receipt and specification for patent application entitled "Multi-Layer Coating for Plunger and/or Packing Sleeve," by Justin L. Hurst, et al., filed Jun. 10, 2019 as U.S. Appl. No. 16/436,389.

Acknowledgement receipt and specification for International application entitled "Multi-Layer Coating for Plunger and/or Packing Sleeve," by Justin L. Hurst, et al., filed Jun. 12, 2019 as International application No. PCT/US2019/036785.

Acknowledgement receipt and specification for patent application entitled, "Oil Field Pumps with Reduced Maintenance," by Jim B. Surjaatmadja, et al., filed Jul. 26, 2019 as U.S. Appl. No. 16/522,860.

Acknowledgement receipt and specification for patent application entitled, "Fail Safe Suction Hose for Significantly Moving Suction Port," by Jim B. Surjaatmadja, et al., filed Jul. 26, 2019 as U.S. Appl. No. 16/522,874.

Acknowledgement receipt and specification for International application entitled "Oil Field Pumps with Reduced Maintenance," by Jim B. Surjaatmadja, et al., filed Jul. 30, 2019 as International application No. PCT/US2019/044191.

Acknowledgement receipt and specification for International application entitled "Fail Safe Suction Hose for Significantly Moving Suction Port," by Jim B. Surjaatmadja, et al., filed Jul. 30, 2019 as International application No. PCT/US2019/044194.

Filing Receipt and Specification for patent application entitled "Flexible Manifold for Reciprocating Pump," by Joseph A. Beisel, et al., filed Oct. 7, 2019 as U.S. Appl. No. 16/594,825.

Office Action (Restriction Requirement) dated Aug. 28, 2019, (7 pages), U.S. Appl. No. 16/522,874, filed Jul. 26, 2019.

Office Action (Restriction Requirement) dated Aug. 30, 2019, (5 pages), U.S. Appl. No. 16/436,356, filed Jun. 10, 2019.

Office Action dated Oct. 22, 2019 (27 pages), U.S. Appl. No. 16/522,874, filed Jul. 26, 2019.

Office Action dated Oct. 31, 2019 (21 pages), U.S. Appl. No. 16/436,356, filed Jun. 10, 2019.

Scully Intellicheck2, Complete Overfill Prevention and Retained Product Monitoring System, 67293 Rev B, Oct. 2013, 2 pages.

Scully Intellicheck2, Complete Overfill Prevention and Retained Product Monitoring System, 67293 Rev B, May 2014, 2 pages.

Scully Intellicheck3, Complete Overfill Prevention and Retained Product Monitoring System, XXXXX Rev A, Jun. 2016, 2 pages.

Acknowledgement receipt and specification for patent application entitled, "Pump Fluid End with Easy Access Suction Valve," by Justin L. Hurst, et al., filed May 14, 2019 as U.S. Appl. No. 16/411,891.

Acknowledgement receipt and specification for patent application entitled, "Easy Change Pump Plunger," by Justin L. Hurst, et al., filed May 14, 2019 as U.S. Appl. No. 16/411,894.

Acknowledgement receipt and specification for patent application entitled, "Pump Valve Seat with Supplemental Retention," by Justin L. Hurst, et al., filed May 14, 2019 as U.S. Appl. No. 16/411,898.

Acknowledgement receipt and specification for patent application entitled, "Flexible Manifold for Reciprocating Pump," by Joseph A. Beisel, et al., filed May 14, 2019 as U.S. Appl. No. 16/411,901.

Acknowledgement receipt and specification for patent application entitled, "Valve Assembly for a Fluid End with Limited Access," by Justin L. Hurst, et al., filed May 14, 2019 as U.S. Appl. No. 16/411,910.

Acknowledgement receipt and specification for patent application entitled, "Pump Fluid End with Positional Indifference for Maintenance," by Justin L. Hurst, et al., filed May 14, 2019 as U.S. Appl. No. 16/411,911.

Foreign Communication from Related Application—International Search Report and Written Opinion of the International Searching Authority, International Application No. PCT/US2020/022069, dated Jul. 3, 2020, 14 pages.

* cited by examiner

US 10,808,846 B1

PUMP PLUNGER WITH WRENCH FEATURES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern ease of access to pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a pump fluid end and components thereof, such as a reciprocating element, that facilitate access to the pump fluid end and components therein, such as a reciprocating element, components of a suction valve assembly, components of a discharge valve assembly, or a combination thereof.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are a reciprocating element and a reciprocating apparatus for pumping pressurized fluid comprising the reciprocating element. In embodiments, the reciprocating apparatus comprises a reciprocating element comprising a cylindrical body having a front end opposite a tail end, and a central axis. The tail end of the cylindrical body is configured to be operatively connected to a pump power end operable to reciprocate the reciprocating element along a path within a bore of a pump fluid end during operation of a pump comprising the pump power end, the pump fluid end, and the reciprocating element. According to this disclosure, the front end of the cylindrical body of the reciprocating element comprises one or more tool engagement features positioned about an outer circumference of the front end of the cylindrical body of the reciprocating element. The one or more tool engagement features are adapted to engage a corresponding one or more reciprocating element engagement features of a reciprocating element end of a tool, such that the reciprocating element can be rotated, pulled, and/or pushed via the tool relative to the central axis of the cylindrical body. In embodiments, the reciprocating apparatus is a high-pressure pump configured to operate at a pressure greater than or equal to about 3,000 psi and/or in a well servicing operation and environment.

Figure 1:
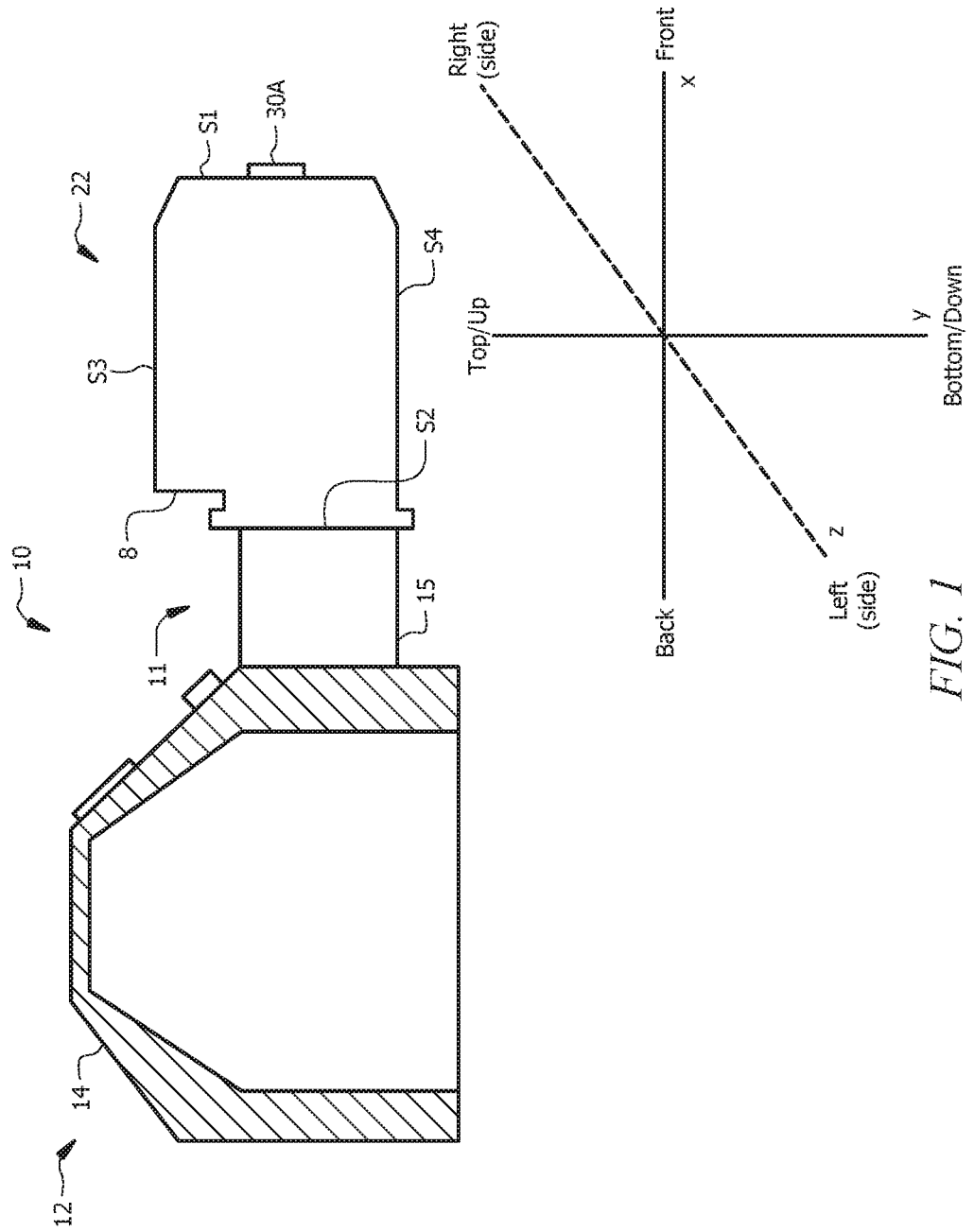
FIG. 1 is an elevational view of a reciprocating pump, according to embodiments of this disclosure.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the x-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2:
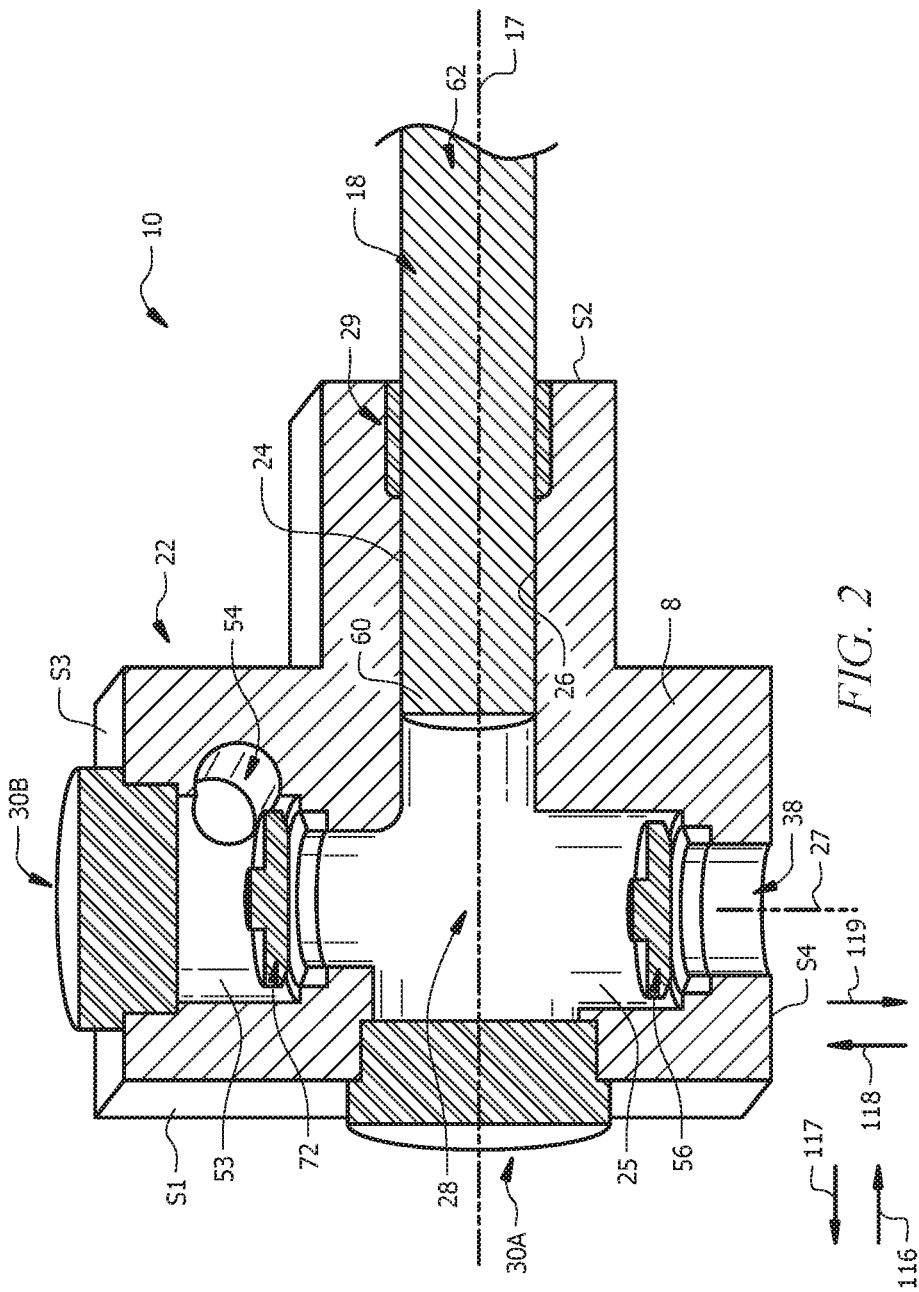
FIG. 2 is a cut-away illustration of an exemplary reciprocating pump comprising a cross-bore pump fluid end, according to embodiments of the present disclosure.
Figure 3:
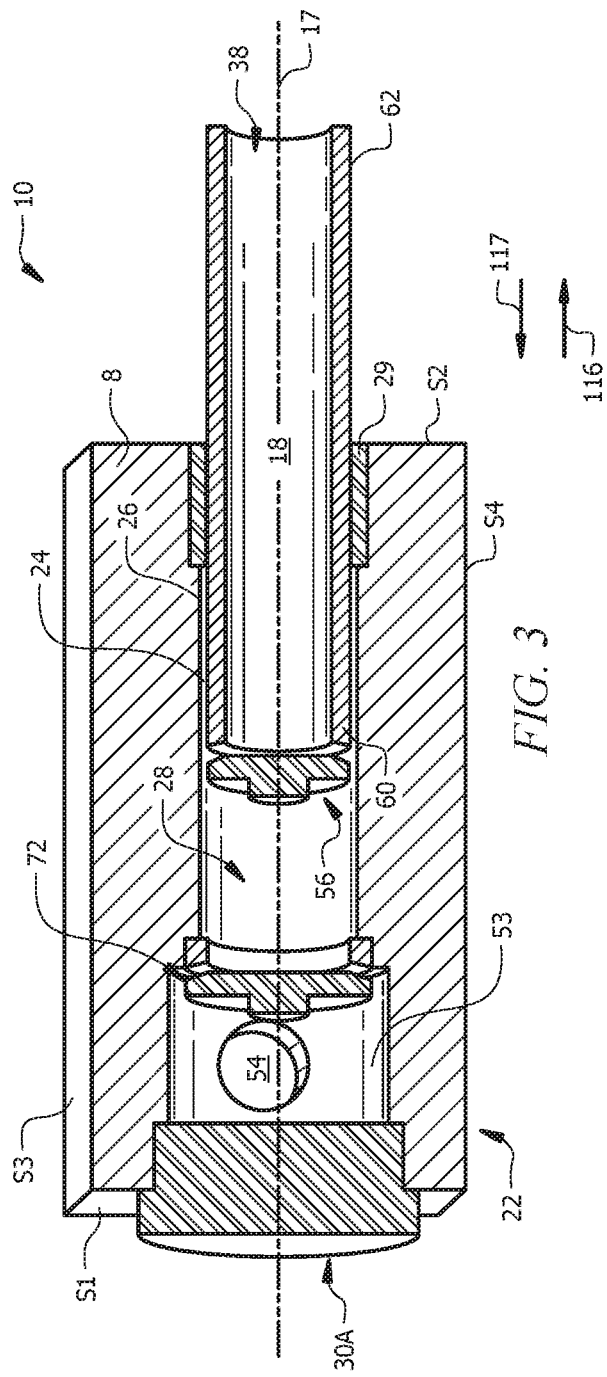
FIG. 3 is a cut-away illustration of an exemplary reciprocating pump comprising a concentric bore pump fluid end, according to embodiments of the present disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIG. 2 and FIG. 3, pump fluid end 22 can be a cross-bore pump fluid end 22 or, alternatively, an in-line or "concentric" bore pump fluid end. As utilized herein, cross-bore pump fluid ends can comprise "T-bore" pump fluid ends, "X-bore" (e.g., cross shaped bore) pump fluid ends, or "Y-bore" pump fluid ends. FIG. 2 is a schematic showing a cross-bore pump fluid end 22 engaged with a reciprocating element 18 and FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
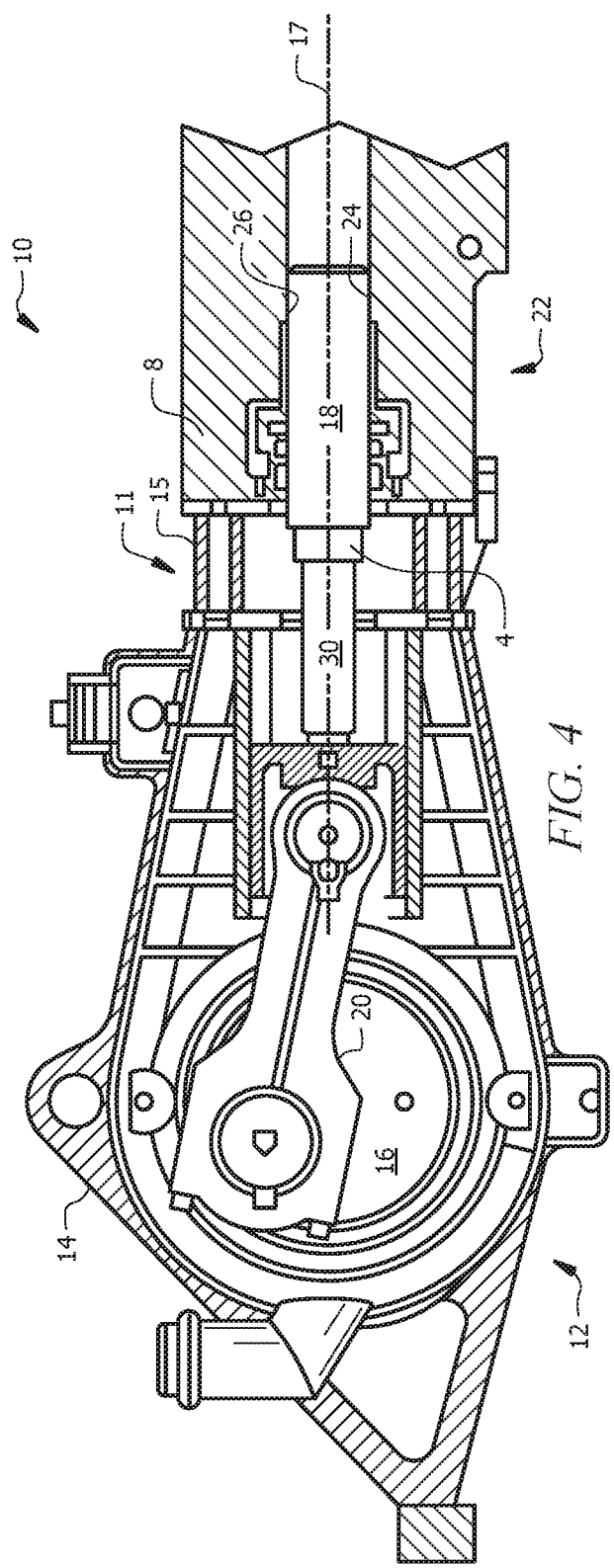
FIG. 4 is cut-away illustration of a pump power end of a pump, according to embodiments of the present disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/connecting rod 20. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", although not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2 and 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1) and return strokes (also referred to as suction strokes and correlating to movement in a negative direction parallel to the x-axis of FIG. 1), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body and a valve seat thereof) and a configuration in which fluid cannot flow through the valve assembly (e.g., cannot pass between a valve body and a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiment of FIG. 2, a front access port 30A can be located on a front S1 of the pump fluid end 22 opposite a back S2 of the pump fluid end 22, wherein the back S2 of the pump fluid end is proximal the pump power end 12, upon integration therewith via integration section 11. A top access port 30B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 30A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2, top access port 30B is located on a side (e.g., top side) of discharge valve assembly 72 opposite suction valve assembly 56, while in the concentric bore pump fluid end 22 embodiment of FIG. 3, front access port 30A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 may be arranged around the reciprocating element 18 to provide sealing between the outer walls of the reciprocating element 18 and the inner walls 26 defining at least a portion of the reciprocating element bore 24. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24. In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 4; e.g., clamps, adapters, extensions, etc.) may be used to couple the reciprocating element 18 to the pump power end 12 (e.g., to a pushrod 30).

In some embodiments (e.g., cross-bore pump fluid end 22 embodiments such as FIG. 2), the reciprocating element may be substantially solid and/or impermeable (e.g., not hollow). In alternative embodiments (e.g., concentric bore pump fluid end 22 embodiment such as FIG. 3), the reciprocating element 18 comprises a peripheral wall defining a hollow body. Additionally (e.g., concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration. The suction valve assembly 56 may be disposed within reciprocating element bore 24 and at least partially within reciprocating element 18 in concentric bore pump fluid end 22 designs such as FIG. 3, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2), and, in concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2 and 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2 and 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Description of a reciprocating element 18 of this disclosure will now be made with reference to FIG. 5, which is a schematic representation of an embodiment of a reciprocating element 18, according to embodiments of the present disclosure. Reciprocating element 18 comprises a cylindrical body 19 (e.g., in embodiments, a solid and/or hollow cylindrical body) having a front end 60 opposite a tail end 62, and a central axis 17A. During operation of a pump 10 of this disclosure comprising reciprocating element 18, central axis 17A of reciprocating element 18 is coincident (also referred to as coaxial) with central axis 17 of pump fluid end 22. As described hereinabove with reference to FIGS. 1-4, tail end 62 of the cylindrical body 19 is configured to be operatively connected to a pump power end 12 operable to reciprocate the reciprocating element 18 along a path within bore 24 of a pump fluid end 22 during operation of a pump 10 comprising the pump power end 12, the pump fluid end 12, and the reciprocating element 18.

Front end 60 of the cylindrical body 19 of reciprocating element 18 comprises one or more tool engagement features 64 positioned about an outer circumference of the front end 60 of the cylindrical body 19 of the reciprocating element 18. With reference to FIG. 6, which is a schematic cross section view of a pump fluid end 22 comprising the reciprocating element 18 of FIG. 5 engaged with a reciprocation element manipulation tool 92 (also referred to herein as a "tool" 92), the one or more tool engagement features 62 are adapted or configured to engage a corresponding one or more reciprocating element engagement features 95 of a reciprocating element end 94 of tool 92, such that the reciprocating element 18 can be rotated, pulled, and/or pushed via tool 92 relative to the central axis 17A of the cylindrical body 19.

Reciprocating element packing 29 (FIG. 2 and FIG. 3) has a tight fit around reciprocating element 18. Accordingly, enabling rotation (e.g., relative to central axis 17/17A) of reciprocating element 18 during insertion thereof into or removal thereof from reciprocating element bore 24 (e.g., while simultaneously moving the reciprocating element axially along central axis 17/17A) allows for a reduction in friction between reciprocating element 18 and reciprocating element packing 29, such that an effort needed to move reciprocating element 18 through reciprocating element packing 29 is reduced. The ability to rotate reciprocating element 18 provided by the tool engagement features 64 of reciprocating element 18 and tool 92 also allows for coupling of reciprocating element 18 with pump power end 12 and decoupling of reciprocating element 18 from pump power end 12 (e.g., coupling/decoupling of reciprocating element 18 with/from one or more additional components or mechanical linkages 4 (FIG. 4, e.g., clamps, adapters, extensions, pushrods, or a combination thereof) used to couple the reciprocating element 18 to the pump power end 12), in embodiments.

Figure 5:
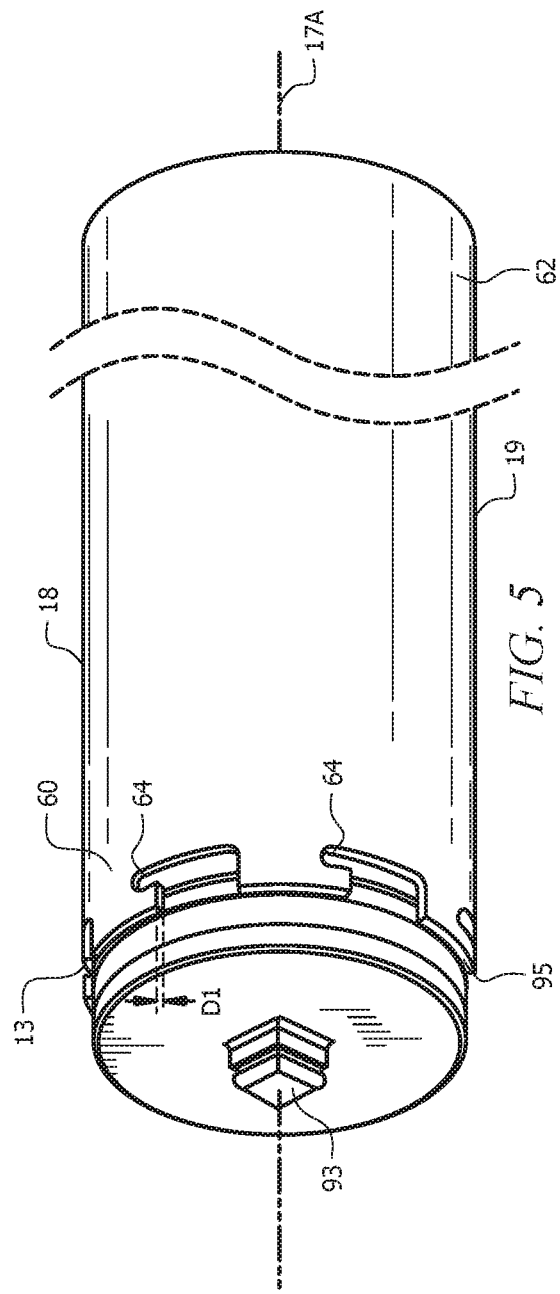
FIG. 5 is a schematic representation of an embodiment of a reciprocating element, according to embodiments of the present disclosure.
Figure 6:
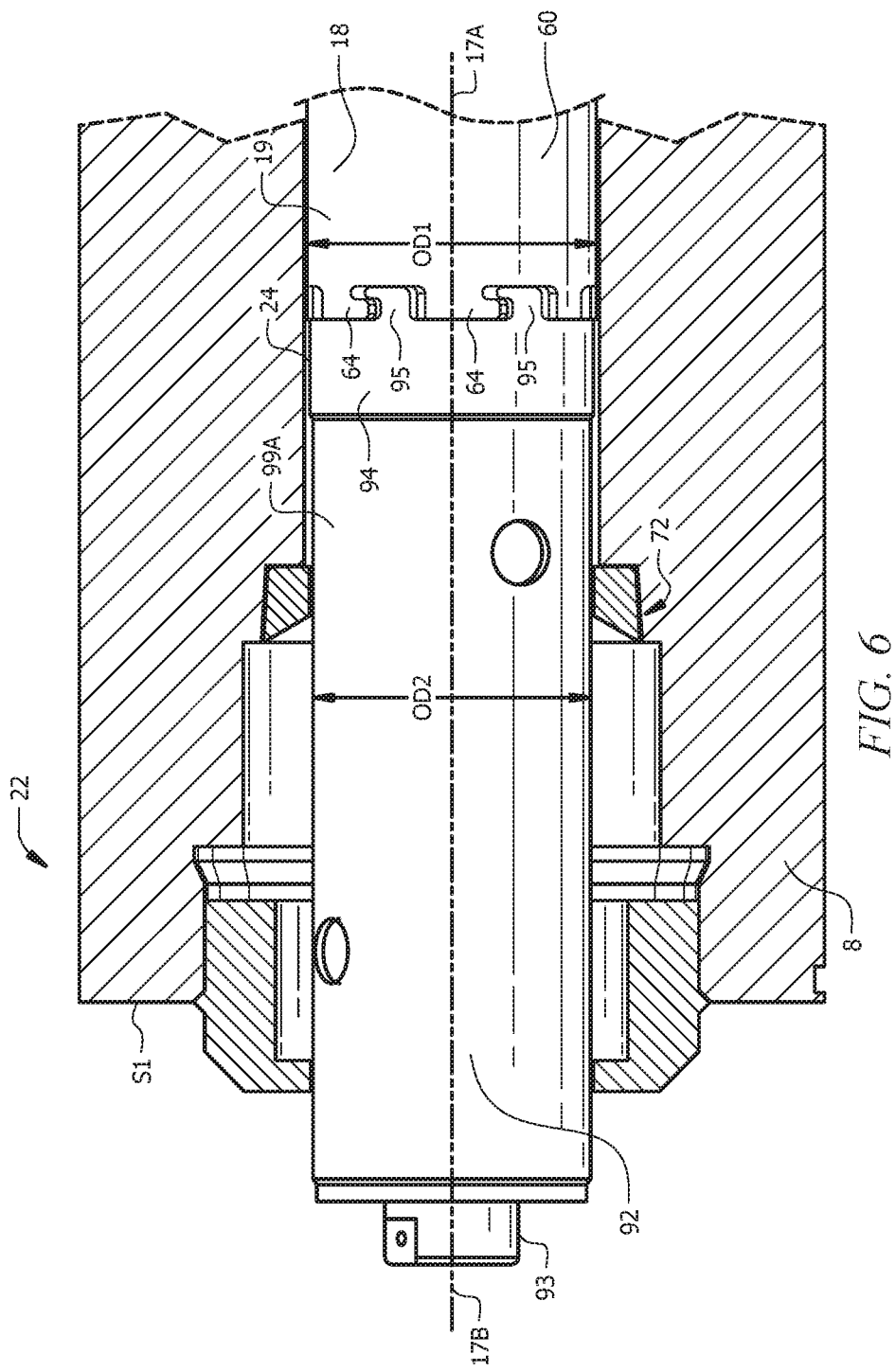
FIG. 6 is a schematic cross section view of a pump fluid end comprising the reciprocating element of FIG. 5 engaged with a tool.

As depicted in the embodiment of FIG. 5 and FIG. 6, the one or more tool engagement features 64 of reciprocating element 18 can comprise one or more slots. Although depicted as having an L-shape in the embodiment of FIG. 5 and FIG. 6, the one or more tool engagement features 64 of reciprocating element 18 (e.g., the slots) can have any suitable shape that provides for mating of the front end 60 of the reciprocating element 18 with the reciprocating element end 94 of tool 92, such that the reciprocating element 18 can be rotated, pulled, and/or pushed via tool 92 relative to the central axis 17A of the cylindrical body 19. Such shapes will be apparent to those of skill in the art with the help of this disclosure. In embodiments, the one or more tool engagement features 64 of reciprocating element 18 comprise a shape comprising a J-shape, a T-shape, an L-shape, or a combination thereof. For example, with reference to FIG. 7, which is a schematic cross section view of a pump fluid end 22 comprising a reciprocating element 18 engaged with a tool 92, according to other embodiments of this disclosure, tool engagement features 64 of reciprocating element 18 and reciprocating element engagement features 95 of tool 92 can comprise a T-shape, wherein a length L1 of the top of the T-shape of reciprocating element engagement features 95 of tool 92 is less than a length of the bottom of the T-shape of tool engagement features 64 of reciprocating element 18, such that the reciprocating engagement features 95 of tool 92 can be inserted into the tool engagement features 64 of reciprocating element 18. Many other variations are possible, such as combinations of a T-shape of reciprocating element engagement features 95 of tool 92 and a J-shape of tool engagement features 64 of reciprocating element 18. In embodiments, the reciprocating element engagement features 95 of the tool 92 are rotatably lockable with the tool engagement features 64 of the reciprocating element 18, whereby the reciprocating element 18 can be rotated and pulled and/or rotated and pushed via the tool 92 relative to the central axis 17A of the cylindrical body 19.

In embodiments, the front end 60 of the cylindrical body 19 (e.g., a hollow cylindrical body) of reciprocating element 18 comprises a wall 95 having a wall thickness 13 in a direction perpendicular to central axis 17A of cylindrical body 19, and the one or more tool engagement features 64 of reciprocating element 18 extend a depth D1 into the wall 95 that is less than or substantially equal to the wall thickness 95. That is, tool engagement features 64 of reciprocating element 18 may or may not extend all the way through wall 95 (i.e., in a direction perpendicular to central axis 17A of cylindrical wall 19) of front end 60 of reciprocating element 18. In an embodiment, wall 95 is a solid wall (e.g., a solid cylindrical body) and tool engagement features 64 of reciprocating element 18 do not extend all the way through wall 95 (i.e., in a direction perpendicular to central axis 17A of cylindrical wall 19) of front end 60 of reciprocating element 18. In an aspect, tool engagement features 64 are surface features formed (e.g., machined or cast) into the outer surface of the cylindrical body 19.

As described previously herein, in embodiments, reciprocating element 18 comprises a plunger or a piston. As described further hereinbelow, in embodiments of a pump 10 of this disclosure comprising a concentric bore pump fluid end 22, front end 60 of cylindrical body 19 (e.g., a hollow cylindrical body) of reciprocating element 18 can be configured for coupling with a suction valve assembly 56. The suction valve assembly 56 can comprise, for example, a valve body that can move toward and away from a valve seat of the valve assembly, whereby the suction valve assembly 56 closes and opens, respectively, during reciprocation of reciprocating element 18 within reciprocating element bore 24 (FIGS. 2-3). In such embodiments, reciprocating element 18 can further comprise a valve seat housing located at front end 60 of cylindrical body 19 (e.g., a hollow cylindrical body).

Figure 7:
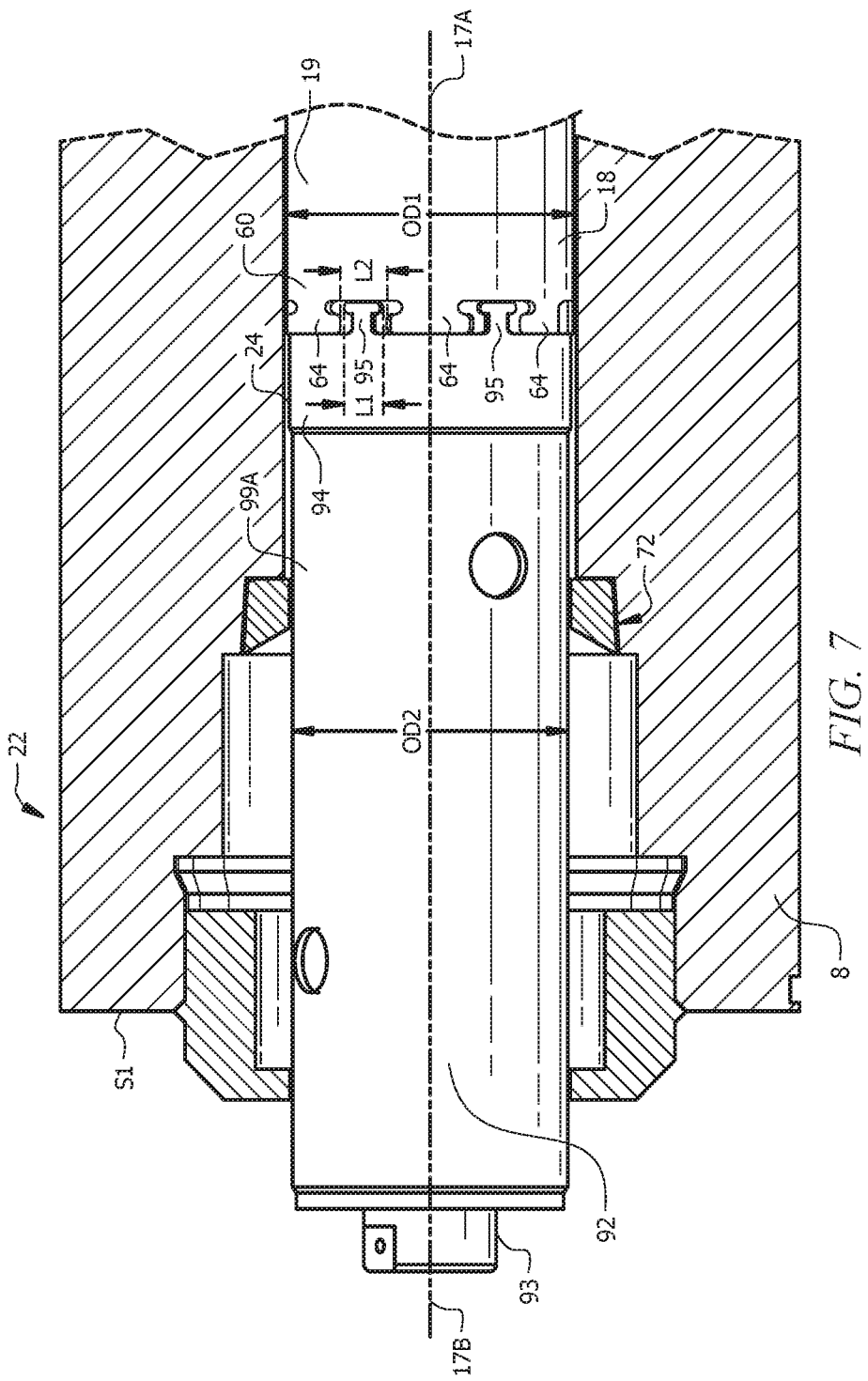
FIG. 7 is a schematic cross section view of a pump fluid end comprising a reciprocating element engaged with a tool, according to other embodiments of this disclosure.

Also disclosed herein is a reciprocating element manipulation tool 92, as shown in FIGS. 6 and 7. As noted hereinabove, reciprocating element manipulation tool 92 comprises actuating end 93 and reciprocating element end 94. The reciprocating element end 94 comprises one or more reciprocating element engagement features 95 adapted or configured to engage a corresponding one or more tool engagement features 64 of a reciprocating element 18, such that the reciprocating element 18 can be rotated, pulled, and/or pushed via the tool 92 by engaging the tool engagement features 64 of the reciprocating element 18 with the reciprocating element engagement features 95 of the tool 92 such that a central axis 17B of the tool 92 and a central axis 17A of the reciprocating element 18 are coaxial, and rotating, pushing, and/or pulling the reciprocating element 18 relative to its central axis 17A by correspondingly rotating, pushing, and/or pulling the actuating end 93 of the tool 92 relative to its central axis 17B.

Reciprocating element manipulation tool 92 also comprises a cylindrical body 99, which may be solid and/or hollow. In embodiments wherein the one or more tool engagement features 64 of reciprocating element 18 comprise a plurality of slots positioned about an outer circumference of front end 60 of cylindrical body 19 of reciprocating element 18, the one or more reciprocating element engagement features 95 of tool 92 can comprise a plurality of lugs configured to correspondingly fit into the one or more slots and positioned about an outer circumference of the reciprocating element end 94 of the cylindrical body 99 of the tool 92. In embodiments, the one or more reciprocating element engagement features 95 of tool 92 can have a size and shape that are complimentary to and engage or mate with the size and shape of the corresponding one or more tool engagement features 64 of a reciprocating element 18, including without limitation a J-shape, a T-shape, an L-shape, or a combination thereof. In embodiments, an outside diameter OD2 of tool 92 is substantially equal to an outside diameter OD1 of reciprocating element 18.

Figure 8:
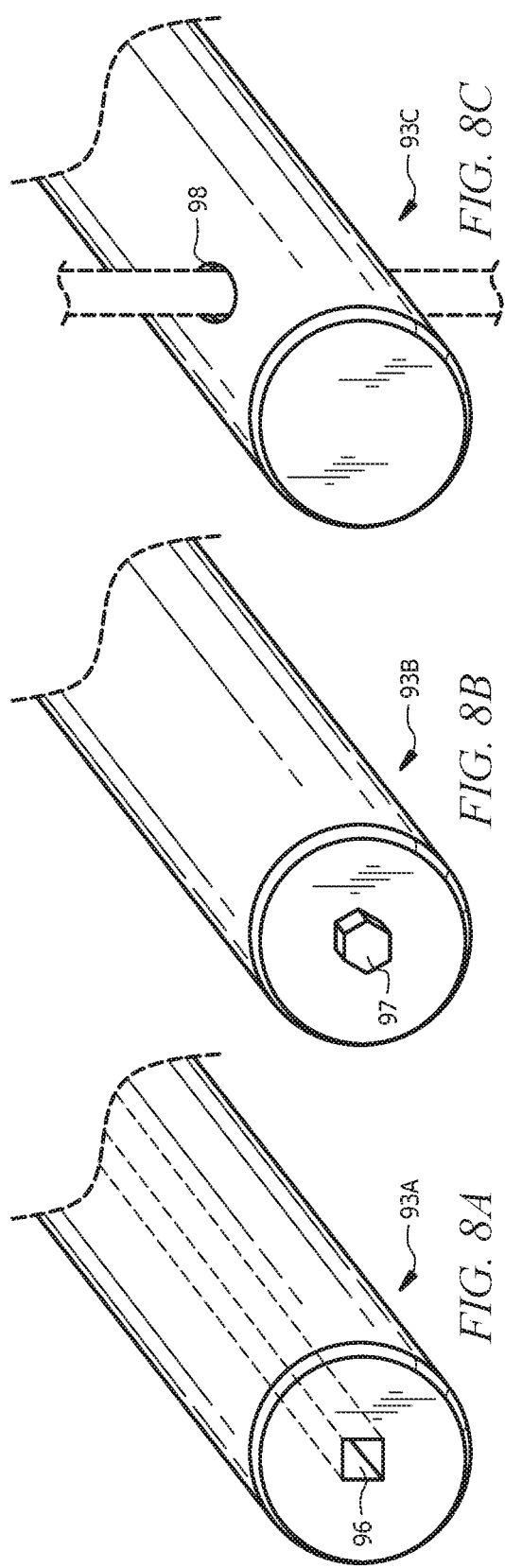
FIG. 8A is a schematic representation of an embodiment of an actuating end of a tool, according to embodiments of this disclosure.
FIG. 8B is a schematic representation of an embodiment of an actuating end of a tool, according to embodiments of this disclosure.
FIG. 8C is a schematic representation of an embodiment of an actuating end of a tool, according to embodiments of this disclosure.

The actuating end 93 of tool 92 can be of any design such that reciprocating element 18 can be rotated, pulled, and/or pushed via the tool 92 by engaging the tool engagement features 64 of the reciprocating element 18 with the reciprocating element engagement features 95 of the tool 92 such that a central axis 17B of the tool 92 and a central axis 17A of the reciprocating element 18 are coaxial, and rotating, pushing, and/or pulling the reciprocating element 18 relative to its central axis 17A by correspondingly rotating, pushing, and/or pulling the actuating end 93 of the tool 92 relative to its central axis 17B. That is, actuating end 93 of tool 92 can have any configuration that allows for rotating, pushing, and/or pulling the actuating end 93. Such configurations will be apparent to those of skill in the art and with the help of this disclosure. Exemplary configurations of actuating ends 93 suitable for use according to embodiments of this disclosure will now be described with reference to FIG. 8A, FIG. 8B, and FIG. 8C. As depicted in FIG. 8A, which is a schematic representation of an embodiment of an actuating end 93A of a tool 92, according to embodiments of this disclosure, actuating end 93A can comprise an internal square drive 96 (e.g., a solid cylindrical body having a square bore in an end therein). In such embodiments, tool 92 can be rotated, pulled, and/or pushed by rotating, pulling, and/or pushing internal square drive 96, for example, via a wrench such as a ratcheting wrench. As depicted in FIG. 8B, which is a schematic representation of an embodiment of an actuating end 93B of a tool 92, according to embodiments of this disclosure, actuating end 93B can comprise an external lug such as hex 97 (e.g., a solid cylindrical body having a solid lug protruding from an end thereof that may be of any desirable shape such as square or hexagonal). In such embodiments, tool 92 can be rotated, pulled, and/or pushed by rotating, pulling, and/or pushing external hex 97, for example, via a wrench or a socket and ratchet. As depicted in FIG. 8C, which is a schematic representation of an embodiment of an actuating end 93C of a tool 92, according to embodiments of this disclosure, actuating end 93C can comprise a through hole 98 (e.g., a solid cylindrical body having a bore of any effective shape (e.g., circular) in a side there of). In such embodiments, tool 92 can be rotated, pulled, and/or pushed by rotating, pulling, and/or pushing internal square drive 96, for example, via a bar inserted into through hole 98.

Also disclosed herein is a pump fluid end 22 comprising a reciprocating element 18 of this disclosure, and a pump 10 comprising the pump fluid end 22. In embodiments, a pump fluid end 22 of this disclosure comprises a suction valve assembly 56 and/or a discharge valve assembly 72.

In embodiments, discharge valve assembly 72 and/or suction valve assembly 56 comprises a valve assembly having a valve guide, as described, for example, in U.S. patent application Ser. No. 16/411,910 filed May 14, 2019 and is entitled "Valve Assembly for a Fluid End with Limited Access", the disclosure of which is hereby incorporated herein in its entirety for purposes not contrary to this disclosure.

In embodiments, a discharge valve seat of discharge valve assembly 72 and/or a suction valve seat of suction valve assembly 56 is a valve seat with supplemental retention, as described, for example, in U.S. patent application Ser. No. 16/411,898 filed May 14, 2019 and is entitled "Pump Valve Seat with Supplemental Retention", the disclosure of which is hereby incorporated herein in its entirety for purposes not contrary to this disclosure.

In embodiments, pump fluid end 22 is a pump fluid end 22 with an easy access suction valve, as described, for example, in U.S. patent application Ser. No. 16/411,891 filed May 14, 2019 and is entitled "Pump Fluid End with Easy Access Suction Valve", the disclosure of which is hereby incorporated herein in its entirety for purposes not contrary to this disclosure.

In embodiments, the pump fluid end 22 comprising a reciprocating element of this disclosure (e.g., having tool engagement features 64), is a cross-bore pump fluid end 22 (e.g., of the type shown in FIG. 2 and described in detail herein) comprising a fluid end body 8 comprising a cross-bore pump chamber 28, a cylindrical reciprocating element bore 24, partially defined by cylinder walls 26, in which reciprocating element 18 can reciprocate during operation of a pump comprising the pump fluid end 22, the reciprocating element 18, a pump power end 12 (FIG. 4), and a cylindrical cross-bore 25 comprising a suction valve assembly 56 and a discharge valve assembly 72. For example, in such embodiments, the discharge valve assembly 72 can be positioned coaxially above the suction valve assembly 56 within cross-bore 25.

In embodiments, the pump fluid end 22 comprising a reciprocating element 18 of this disclosure (e.g., having tool engagement features 64), is a concentric bore pump fluid end 22 (e.g., of the type shown in FIG. 3 and described in detail herein) comprising a fluid end body 8 comprising a concentric bore pump chamber 28, a cylindrical reciprocating element bore 24, partially defined by cylinder walls 26, in which a reciprocating element 18 can reciprocate during operation of a pump comprising the pump fluid end 22, the reciprocating element 18, a pump power end 12 (FIG. 4), and a discharge valve assembly 72 located at one end (e.g., proximate the front end) of reciprocating element bore 24 and a suction valve assembly 56 located at least partially within front end 60 of reciprocating element 18. In such embodiments, such as depicted in FIG. 3, the suction valve assembly 56 and the discharge valve assembly 72 can be positioned coaxially along central axis 17.

In some such concentric bore pump fluid end 22 embodiments, pump 10 comprises a flexible manifold, as described, for example, in U.S. patent application Ser. No. 16/411,901 filed May 14, 2019 and is entitled "Flexible Manifold for Reciprocating Pump", the disclosure of which is hereby incorporated herein in its entirety for purposes not contrary to this disclosure.

Also disclosed herein is a method of servicing a pump 10 of this disclosure. According to this disclosure, a method of servicing a pump 10 of this disclosure comprises accessing the reciprocating element bore 24 of the pump fluid end 22 of pump 10. Accessing the reciprocating element bore 24 can comprise opening front access port 30A of the pump fluid end 22 located on front S1 of pump fluid end 22, as shown in FIGS. 1, 2 and 3. The method of servicing the pump 10, according to this disclosure, further comprises inserting tool 92 through open access port 30A and engaging the tool engagement features 64 of the reciprocating element 18 with the reciprocating element engagement features 95 of the tool 92, and removing the reciprocating element 18 from the pump fluid end 22 by rotating and pulling the reciprocating element 18 via the tool 92 relative to the central axis 17A of the cylindrical body of reciprocating element 18. Upon servicing or replacing the reciprocating element 18, the method further comprises positioning the or another reciprocating element 18 within the pump fluid end 22 via open access port 30A and rotating and pushing the reciprocating element 18 or the another reciprocating element 18 via the tool 92 relative to the central axis 17A of the cylindrical body 19 of reciprocating element 18. In embodiments, reciprocating element 18 is inserted into or removed from pump fluid end 22 without rolling pump power end 12 (i.e., without rotating crankshaft 16 therein).

In embodiments, pump fluid end 22 comprises a packing assembly, such that packing 29, a packing carrier, and a packing screw can be removed from back S2 of pump fluid end 22 when crankshaft 16 is at TDC, as described, for example, in U.S. patent application Ser. No. 16/411,911 filed May 14, 2019 and is entitled "Pump Fluid End with Positional Indifference for Maintenance", the disclosure of which is hereby incorporated herein in its entirety for purposes not contrary to this disclosure.

In embodiments, a method of servicing a pump 10 of this disclosure comprises removing the reciprocating element 18 from the pump fluid end 18 via open access port 30A by rotating and pulling the reciprocating element 18 via the tool 92 relative to the central axis 17A of the cylindrical body 19 of reciprocating element 18; optionally performing a maintenance on the pump fluid end 22 of the pump 10, the reciprocating element 18, or both; and positioning the or another reciprocating element 18 within the pump fluid end 22 via open access port 30A by rotating and pushing the reciprocating element 18 or the another reciprocating element 18 via the tool 92 relative to the central axis 17A of the cylindrical body 19 of reciprocating element 18.

Performing a maintenance on the pump fluid end 22 of the pump 18 can comprise performing any maintenance on pump fluid end 22 that requires removal of reciprocating element 18 therefrom. For example, in embodiments, performing maintenance comprises repacking a reciprocating element packing 29 within the reciprocating element bore 24. In embodiments, performing a maintenance on the reciprocating element 18 comprises replacing or repairing a suction valve assembly 56 (or a component thereof, e.g., a suction valve body) integrated with the reciprocating element 18 and/or the reciprocating element 18 (e.g., a hollow cylindrical reciprocating element 18 in a concentric bore pump fluid end 22 of the type shown in FIG. 3).

In embodiments, as noted hereinabove with reference to the embodiment of FIG. 4, pump 10 comprises one or more additional components or mechanical linkages 4 (e.g., clamps, adapters, extensions, etc.) used to couple the reciprocating element 18 to the pump power end 12 (e.g., to a crank arm/connecting rod 20 and/or pushrod 30), for example when removing the reciprocating element 18 to perform maintenance on the reciprocating element 18 and/or the pump fluid end 22. In embodiments, reciprocating element 18 is coupled with a pushrod 30 of pump power end 12 via a reciprocating element adapter, as described, for example, in U.S. patent application Ser. No. 16/411,894 filed May 14, 2019 and is entitled "Easy Change Pump Plunger", the disclosure of which is hereby incorporated herein in its entirety for purposes not contrary to this disclosure.

In some such embodiments, the one or more additional components 4 comprise a pushrod of power end 12 and/or a reciprocating element adapter further coupled to a pushrod of power end 12. In such embodiments, removing the reciprocating element 18 from the pump fluid end 22 by rotating and pulling the reciprocating element 18 via the tool 92 relative to the central axis 17A of the cylindrical body 19 of reciprocating element 18 can further comprise decoupling (e.g., via unscrewing a threaded connection) the tail end 62 of the cylindrical body 19 of the reciprocating element 18 from the reciprocating element adapter further coupled to the pushrod of the power end 12 and/or otherwise decoupling (e.g., via unscrewing a threaded connection) the tail end 62 of the cylindrical body 19 of the reciprocating element 18 from the pushrod of the power end 22, and positioning the or the another reciprocating element 18 within the pump fluid end 22 by rotating and pushing the reciprocating element 18 or the another reciprocating element 18 via the tool 92 can further comprise coupling (e.g., via screwing a threaded connection) the tail end 62 of the cylindrical body 19 of the reciprocating element 18 or the another reciprocating element 18 with the reciprocating element adapter further coupled to the pushrod of the power end 12 and/or otherwise coupling (e.g., via screwing a threaded connection) the tail end 62 of the cylindrical body 19 of the reciprocating element 18 or the another reciprocating element 18 directly with the pushrod of the power end 12.

In embodiments, the one or more additional components or mechanical linkages 4 comprise a reciprocating element adapter coupled to a pushrod of pump power end 12 via a clamp that fixedly couples the reciprocating element adapter in contact with the pushrod of the power end 12. In such embodiments, positioning the or the another reciprocating element 18 within the pump fluid end 22 (e.g., via open access port 30A) by rotating and pushing the reciprocating element 18 or the another reciprocating element 18 via the tool 92 can comprise coupling (e.g., via screwing a threaded connection) the tail end 62 of the cylindrical body 19 of the reciprocating element 18 or the another reciprocating element 18 with the reciprocating element adapter further coupled to the pushrod of the power end via the reciprocating element clamp, such that the tail end 62 of the cylindrical body 19 of the reciprocating element 18 is fixedly coupled to the reciprocating element adapter, whereby, upon positioning of the reciprocating element 18 or the another reciprocating element 18 within the pump fluid end 22, a central axis 17A of the reciprocating element 18 is parallel to or coincident with a central axis of the pushrod.

The front access port 30A is closed prior to resuming operation of the pump 10.

Figure 9:
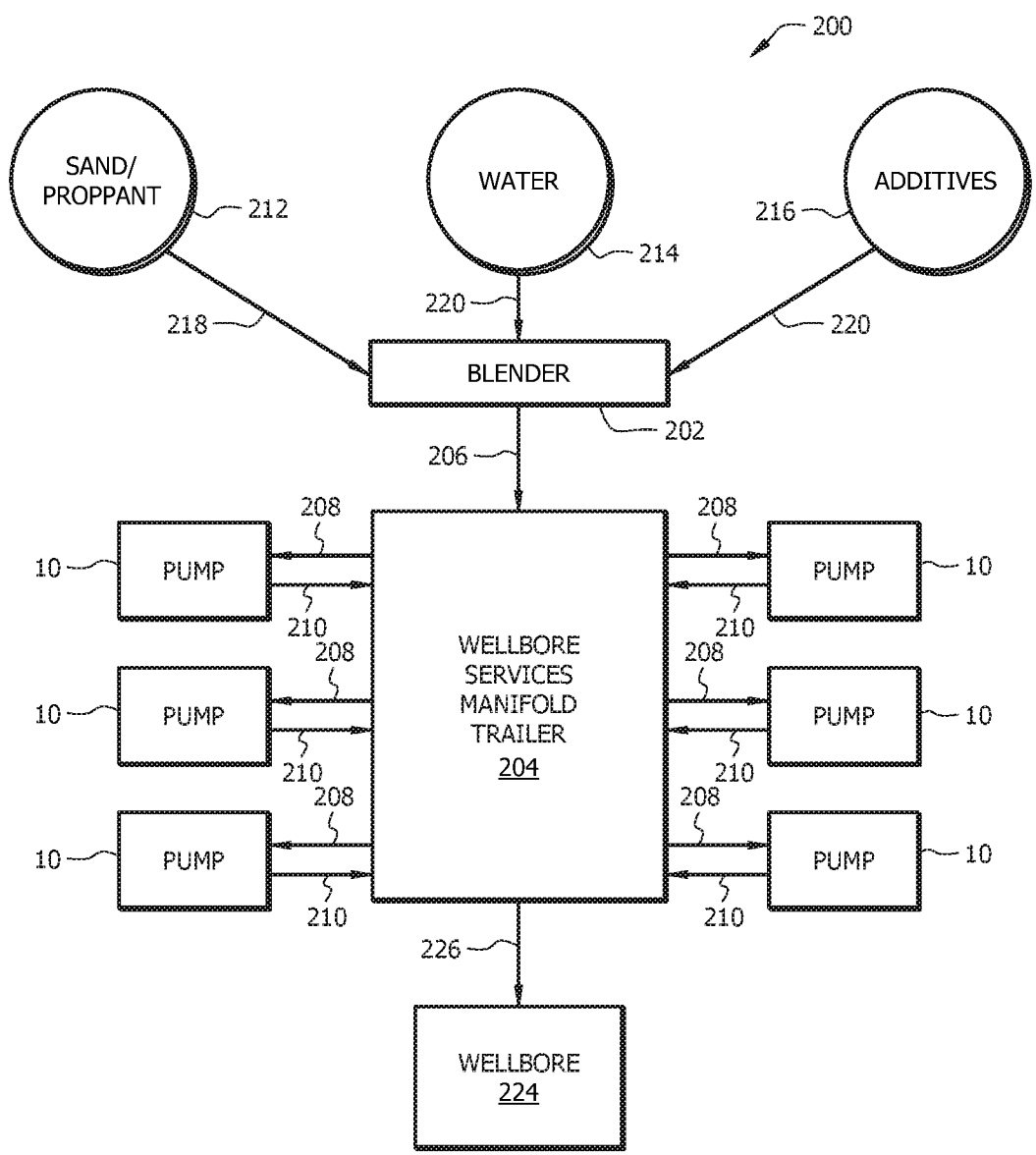
FIG. 9 is a schematic representation of an embodiment of a wellbore servicing system, according to embodiments of this disclosure.

Also disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 9, which is a schematic representation of an embodiment of a wellbore servicing system 200, according to embodiments of this disclosure.

A method of servicing a wellbore 224 according to this disclosure comprises fluidly coupling a pump 10 of this disclosure to a source of a wellbore servicing fluid and to the wellbore, wherein the pump comprises a reciprocating element 18 as described herein, and communicating wellbore servicing fluid into the wellbore via the pump. The method of servicing wellbore 224 according to this disclosure can further comprise discontinuing the communicating of the wellbore servicing fluid into the wellbore via the pump 10, subjecting the pump 10 to maintenance to provide a maintained pump, and communicating the or another wellbore servicing fluid into the wellbore via the maintained pump 10. Subjecting the pump 10 to maintenance can comprise servicing the pump 10 as described hereinabove. In embodiments, for example, subjecting pump 10 to maintenance comprises accessing the reciprocating element bore 24 of the pump fluid end 22, removing the reciprocating element 18 from the pump fluid end 22 by rotating and pulling the reciprocating element 18 via the tool 92, optionally performing a maintenance on the pump fluid end 22 of the pump 10, on the reciprocating element 18, or both, and positioning the or another reciprocating element 18 within the pump fluid end 22 by rotating and pushing the reciprocating element 18 or the another reciprocating element 18 via the tool 92 relative to the central axis 17A of the reciprocating element 18. As noted above, performing a maintenance on the pump fluid end 22 of the pump 10 can comprise, for example and without limitation, repacking a reciprocating element packing 29 within the reciprocating element bore 24, replacing or repairing a suction valve assembly 56 integrated with the reciprocating element 18, replacing or repairing reciprocating element 18, or a combination thereof.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. in embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared onsite (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. For instance, the utilization of a reciprocating element 18 having tool engagement features 64 as described herein can facilitate positioning of the reciprocating element 18 within reciprocating element bore 24. The ability to rotate and push or rotate and pull the reciprocating element 18, during insertion into the reciprocating element bore 24 or removal of reciprocating element 18 from the reciprocating element bore 24, respectively, reduces the friction between the reciprocating element 18 and the reciprocating element packing 29, thus facilitating (e.g., reduces the energy needed to provide for) movement of the reciprocating element 18 within reciprocating element bore 24. The tool engagement features 64 of reciprocating element 18, and the corresponding reciprocating element engagement features 95 of tool 92 can also be used to connect the reciprocating element 18 with power end 12, for example, by connecting reciprocating element 18 with a reciprocating element adapter and/or a pushrod of pump power end 12. According to this disclosure, a method of servicing a pump 10 of this disclosure comprises inserting reciprocating element 18 into or removing reciprocating element 18 from front S1 of pump fluid end 22 by rotating the reciprocating element 18 through reciprocating element packing 29 via tool 92, whereby friction is reduced. According to this disclosure, inserting reciprocating element 18 into or removing reciprocating element 18 from pump fluid end 22 can be accomplished from the front S1 of the pump fluid end 22 (e.g., without having to access the rear S2 of pump fluid end 22).

In embodiments, the herein disclosed fluid end 22 design comprising a reciprocating element 18 of this disclosure can provide for a reduction in pump fluid end 22 maintenance time by at least 10, 20, 30, 40, or 50% relative to a pump fluid end 22 comprising a reciprocating element 18 absent the tool engagement features 64. A reduction in pump fluid end 22 maintenance and/or assembly time reduces exposure of workers performing the maintenance (and thus potentially enhances safety) and also reduces non-productive time on location.

ADDITIONAL DISCLOSURE

The following are non-limiting, specific embodiments in accordance with the present disclosure:

Embodiment A

A reciprocating element comprising: a cylindrical body having a front end opposite a tail end, and a central axis, wherein the tail end of the cylindrical body is configured to be operatively connected to a pump power end operable to reciprocate the reciprocating element along a path within a bore of a pump fluid end during operation of a pump comprising the pump power end, the pump fluid end, and the reciprocating element; and wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, such that the reciprocating element can be rotated, pulled, and/or pushed via the tool relative to the central axis of the cylindrical body.

Embodiment B

The reciprocating element of Embodiment A, wherein the one or more tool engagement features comprise one or more slots.

Embodiment C

The reciprocating element of Embodiment B, wherein the one or more slots have a shape comprising a J-shape, a T-shape, an L-shape, or a combination thereof.

Embodiment D

The reciprocating element of any of Embodiment A through Embodiment C, wherein the reciprocating element engagement features of the tool are rotatably lockable with the tool engagement features of the reciprocating element, whereby the reciprocating element can be rotated and pulled and/or rotated and pushed via the tool relative to the central axis of the cylindrical body.

Embodiment E

The reciprocating element of any of Embodiment B through Embodiment D, wherein the front end of the cylindrical body comprises a wall having a wall thickness, and wherein the one or more slots extend a depth into the wall that is less than or substantially equal to the wall thickness.

Embodiment F

The reciprocating element of any of Embodiment A through Embodiment E, wherein the reciprocating element comprises a plunger or a piston.

Embodiment G

A reciprocating element manipulation tool comprising: an actuating end and a reciprocating element end, wherein the reciprocating element end comprises one or more reciprocating element engagement features adapted to engage a corresponding one or more tool engagement features of a reciprocating element, such that the reciprocating element can be rotated, pulled, and/or pushed via the tool by engaging the tool engagement features of the reciprocating element with the reciprocating element engagement features of the tool such a central axis of the tool and a central axis of the reciprocating element are coaxial and rotating, pushing, and/or pulling the reciprocating element relative to its central axis by correspondingly rotating, pushing, and/or pulling the actuating end of the tool relative to its central axis.

Embodiment H

The reciprocating element manipulation tool of Embodiment G, wherein the actuating end comprises an internal square drive, an external hex, a through hole, or a combination thereof.

Embodiment I

The reciprocating element manipulation tool of Embodiment G or Embodiment H, wherein the reciprocating element manipulation tool and the reciprocating element each comprise a cylindrical body, wherein the one or more tool engagement features comprise a plurality of slots positioned about an outer circumference of one end of the cylindrical body of the reciprocating element, and wherein the one or more reciprocating element engagement features comprise a plurality of lugs configured to fit into the one or more slots and positioned about an outer circumference of the reciprocating element end of the cylindrical body of the tool.

Embodiment J

A method of maintaining or assembling a pump comprising a reciprocating element, the method comprising: accessing a reciprocating element bore of a pump fluid end, wherein the pump comprises a power end and the pump fluid end, wherein the pump power end is operable to reciprocate a reciprocating element along a path within the reciprocating element bore of the pump fluid end during operation of the pump, and wherein the reciprocating element comprises: a cylindrical body having a front end opposite a tail end and a central axis, wherein the tail end of the cylindrical body is configured to be operatively connected to the power end during operation of the pump; and wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, during maintaining and/or assembling of the pump, such that the reciprocating element can be rotated, pulled, and/or pushed via the tool relative to the central axis of the cylindrical body; engaging the tool engagement features of the reciprocating element with the reciprocating element engagement features of the tool; and removing the reciprocating element from the pump fluid end by rotating and pulling the reciprocating element via the tool relative to the central axis of the cylindrical body, and/or positioning the or another reciprocating element within the pump fluid end by rotating and pushing the reciprocating element or the another reciprocating element via the tool relative to the central axis of the cylindrical body.

Embodiment K

The method of Embodiment J comprising: removing the reciprocating element from the pump fluid end by rotating and pulling the reciprocating element via the tool relative to the central axis of the cylindrical body; optionally performing a maintenance on the pump fluid end of the pump, the reciprocating element, or both; and positioning the or another reciprocating element within the pump fluid end by rotating and pushing the reciprocating element or the another reciprocating element via the tool relative to the central axis of the cylindrical body.

Embodiment L

The method of Embodiment K, wherein performing a maintenance on the pump fluid end of the pump comprises repacking a reciprocating element packing within the reciprocating element bore; wherein performing a maintenance on the reciprocating element comprises replacing or repairing a suction valve assembly integrated with the reciprocating element; or a combination thereof.

Embodiment M

The method of Embodiment any of Embodiment J through Embodiment L: wherein removing the reciprocating element from the pump fluid end by rotating and pulling the reciprocating element via the tool relative to the central axis of the cylindrical body further comprises decoupling the tail end of the cylindrical body of the reciprocating element from a reciprocating element adapter further coupled to a pushrod of the power end and/or otherwise decoupling the tail end of the cylindrical body of the reciprocating element from the pushrod of the power end; and wherein positioning the or the another reciprocating element within the pump fluid end by rotating and pushing the reciprocating element or the another reciprocating element via the tool further comprises coupling the tail end of the cylindrical body of the reciprocating element or the another reciprocating element with the reciprocating element adapter further coupled to the pushrod of the power end and/or otherwise coupling the tail end of the cylindrical body of the reciprocating element or the another reciprocating element directly with the pushrod of the power end.

Embodiment N

The method of any of Embodiment J through Embodiment M, wherein positioning the or the another reciprocating element within the pump fluid end by rotating and pushing the reciprocating element or the another reciprocating element via the tool comprises coupling the tail end of the cylindrical body of the reciprocating element or the another reciprocating element with a reciprocating element adapter further coupled to a pushrod of the power end, such that the tail end of the cylindrical body of the reciprocating element is fixedly coupled to the reciprocating element adapter, and wherein the reciprocating element adapter is coupled to the pushrod via a clamp that fixedly couples the reciprocating element adapter in contact with the pushrod of the power end, whereby, upon positioning of the reciprocating element or the another reciprocating element within the pump fluid end, a central axis of the reciprocating element is parallel to or coincident with a central axis of the pushrod.

Embodiment O

The method of any of Embodiment J through Embodiment N, wherein accessing the reciprocating element bore of the pump fluid end comprises opening an access port located on a side of the pump fluid end distal the power end.

Embodiment P

A method of servicing a wellbore, the method comprising: fluidly coupling a pump to a source of a wellbore servicing fluid and to the wellbore, wherein the pump comprises: a power end, a pump fluid end, and a reciprocating element, wherein the power end is operable to reciprocate the reciprocating element along a path within a reciprocating element bore of the pump fluid end during operation of the pump, and wherein the reciprocating element comprises: a cylindrical body having a front end opposite a tail end, and a central axis, wherein the tail end of the cylindrical body is operatively connected to the power end; and wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, during maintaining and/or assembling of the pump, such that the reciprocating element can be rotated, pulled, and/or pushed via the tool relative to the central axis; and communicating wellbore servicing fluid into the wellbore via the pump.

Embodiment Q

The method of Embodiment P further comprising: discontinuing the communicating of the wellbore servicing fluid into the wellbore via the pump; and subjecting the pump to maintenance to provide a maintained pump, wherein subjecting the pump to maintenance comprises: accessing the reciprocating element bore of the pump fluid end; removing the reciprocating element from the pump fluid end by rotating and pulling the reciprocating element via the tool; optionally performing a maintenance on the pump fluid end of the pump, on the reciprocating element, or both; and positioning the or another reciprocating element within the pump fluid end by rotating and pushing the reciprocating element or the another reciprocating element via the tool relative to the central axis; and communicating the or another wellbore servicing fluid into the wellbore via the maintained pump.

Embodiment R

The method of Embodiment Q comprising performing a maintenance on the pump fluid end of the pump, wherein performing maintenance comprises repacking a reciprocating element packing within the reciprocating element bore; wherein performing a maintenance on the reciprocating element comprises replacing or repairing a suction valve assembly integrated with the reciprocating element; or a combination thereof.

Embodiment S

The method of any of Embodiment P through Embodiment R, wherein the wellbore servicing fluid, the another wellbore servicing fluid, or both the wellbore servicing fluid and the another wellbore servicing fluid comprise a fracturing fluid, a cementitious fluid, a remedial fluid, a perforating fluid, a sealant, a drilling fluid, a spacer fluid, a completion fluid, a gravel pack fluid, a gelation fluid, a polymeric fluid, an aqueous fluid, an oleaginous fluid, or a combination thereof.

Embodiment T

The method of any of Embodiment P through Embodiment S, wherein the pump or the maintained pump operates during the pumping of the wellbore servicing fluid or the another wellbore servicing fluid at a pressure of greater than or equal to about 3,000 psi, 5,000 psi, 10,000 psi, 20,000 psi, 30,000 psi, 40,000 psi, or 50,000 psi.

Embodiment U

The method of any of Embodiment P through Embodiment T, wherein the pump or the maintained pump operates during the pumping of the wellbore servicing fluid or the another wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

Embodiment V

A method of maintaining or assembling a pump comprising a reciprocating element, the method comprising: engaging one or more tool engagement features of the reciprocating element with one or more reciprocating element engagement features of a reciprocating element manipulation tool; and removing the reciprocating element from the pump fluid end by rotating and pulling the reciprocating element via the reciprocating element manipulation tool relative to a central axis of the reciprocating element, and/or positioning the or another reciprocating element within the pump fluid end by rotating and pushing the reciprocating element or the another reciprocating element via the reciprocating element manipulation tool relative to the central axis of reciprocating element.

Embodiment W

The method of Embodiment V, wherein the one or more tool engagement features of the reciprocating element are positioned about an outer circumference of a front end of the reciprocating element, wherein the one or more reciprocating element engagement features of the reciprocating element manipulation tool are adapted to engage a corresponding number of the one or more tool engagement features of the reciprocating element and are positioned about an outer circumference of a reciprocating element end of the reciprocating element manipulation tool, such that, during maintaining and/or assembling of the pump, the reciprocating element can be rotated, pulled, and/or pushed via the reciprocating element manipulation tool relative to the central axis of the reciprocating element.

Embodiment X

The method of Embodiment V or Embodiment W further comprising: removing the reciprocating element from the pump fluid end by rotating and pulling the reciprocating element via the reciprocating element manipulation tool relative to the central axis of the reciprocating element; optionally performing a maintenance on the pump fluid end of the pump, the reciprocating element, or both; and positioning the or another reciprocating element within the pump fluid end by rotating and pushing the or the another reciprocating element via the reciprocating element manipulation tool relative to the central axis of the reciprocating element.

Embodiment Y

The method of Embodiment X, wherein performing a maintenance on the pump fluid end of the pump comprises repacking a reciprocating element packing within the pump fluid end; wherein performing a maintenance on the reciprocating element comprises replacing or repairing a suction valve assembly integrated with the reciprocating element; or a combination thereof.

Embodiment Z

The method of Embodiment X or Embodiment Y, wherein performing the maintenance is effected from a front of the pump fluid end, without accessing the pump fluid end from a rear of the pump fluid end.

Embodiment Z1

A method comprising releasably, mechanically coupling a tool to one or more structural features located on an exterior surface of a cylindrical reciprocating pump plunger and applying a force to the plunger via the tool to remove the plunger from a fluid end of a pump comprising the plunger, wherein the plunger is accessed and removed from the fluid end via an access port on the front of the fluid end.

Embodiment Z2

The method of embodiment Z1 wherein the structural features are slots on the exterior surface of the plunger.

Embodiment Z3

The method of embodiment Z1 or Z2 wherein the force is torque applied to the plunger via the tool.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R1+k*(Ru-R1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A reciprocating element comprising:
a cylindrical body having a front end opposite a tail end, and a central axis,
wherein the tail end of the cylindrical body is configured to be operatively connected to a pump power end operable to reciprocate the reciprocating element along a path within a bore of a pump fluid end during operation of a pump comprising the pump power end, the pump fluid end, and the reciprocating element; and
wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, such that the reciprocating element can be rotated, pulled, and pushed via the tool relative to the central axis of the cylindrical body, wherein the one or more tool engagement features comprise one or more slots, wherein the front end of the cylindrical body comprises a wall having a wall thickness, and wherein the one or more slots extend a depth into the wall that is less than or substantially equal to the wall thickness.

2. The reciprocating element of claim 1, wherein the reciprocating element comprises a plunger or a piston.

3. A method of maintaining or assembling a pump comprising the reciprocating element of claim 1, the method comprising:
accessing a reciprocating element bore of a pump fluid end, wherein the pump comprises a power end and the pump fluid end, wherein the pump power end is operable to reciprocate a reciprocating element along a path within the reciprocating element bore of the pump fluid end during operation of the pump, and wherein the reciprocating element comprises:
a cylindrical body having a front end opposite a tail end and a central axis,
wherein the tail end of the cylindrical body is configured to be operatively connected to the power end during operation of the pump; and
wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, during maintaining and/or assembling of the pump, such that the reciprocating element can be rotated, pulled, and pushed via the tool relative to the central axis of the cylindrical body;

engaging the tool engagement features of the reciprocating element with the reciprocating element engagement features of the tool; and removing the reciprocating element from the pump fluid end by rotating and pulling the reciprocating element via the tool relative to the central axis of the cylindrical body, and/or positioning the or another reciprocating element within the pump fluid end by rotating and pushing the reciprocating element or the another reciprocating element via the tool relative to the central axis of the cylindrical body, wherein removing the reciprocating element from the pump fluid end by rotating and pulling the reciprocating element via the tool relative to the central axis of the cylindrical body further comprises decoupling the tail end of the cylindrical body of the reciprocating element from a reciprocating element adapter further coupled to a pushrod of the power end and/or otherwise decoupling the tail end of the cylindrical body of the reciprocating element from the pushrod of the power end; and wherein positioning the or the another reciprocating element within the pump fluid end by rotating and pushing the reciprocating element or the another reciprocating element via the tool further comprises coupling the tail end of the cylindrical body of the reciprocating element or the another reciprocating element with the reciprocating element adapter further coupled to the pushrod of the power end and/or otherwise coupling the tail end of the cylindrical body of the reciprocating element or the another reciprocating element directly with the pushrod of the power end.

4. The method of claim 3, further comprising performing a maintenance on the pump fluid end of the pump, the reciprocating element, or both; wherein the performing a-maintenance on the pump fluid end of the pump comprises repacking a reciprocating element packing within the reciprocating element bore; replacing or repairing a suction valve assembly integrated with the reciprocating element; or a combination thereof.

5. The method of claim 3, wherein positioning the or the another reciprocating element within the pump fluid end by rotating and pushing the reciprocating element or the another reciprocating element via the tool comprises coupling the tail end of the cylindrical body of the reciprocating element or the another reciprocating element with a reciprocating element adapter further coupled to a pushrod of the power end, such that the tail end of the cylindrical body of the reciprocating element is fixedly coupled to the reciprocating element adapter, and wherein the reciprocating element adapter is coupled to the pushrod via a clamp that fixedly couples the reciprocating element adapter in contact with the pushrod of the power end, whereby, upon positioning of the reciprocating element or the another reciprocating element within the pump fluid end, a central axis of the reciprocating element is parallel to or coincident with a central axis of the pushrod.

6. The reciprocating element of claim 1, wherein the reciprocating element engagement features of the tool are rotatably lockable with the tool engagement features of the reciprocating element, whereby the reciprocating element can be rotated and pulled and/or rotated and pushed via the tool relative to the central axis of the cylindrical body.

7. A reciprocating element comprising:
a cylindrical body having a front end opposite a tail end, and a central axis,
wherein the tail end of the cylindrical body is configured to be operatively connected to a pump power end operable to reciprocate the reciprocating element along a path within a bore of a pump fluid end during operation of a pump comprising the pump power end, the pump fluid end, and the reciprocating element; and
wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, such that the reciprocating element can be rotated, pulled, and pushed via the tool relative to the central axis of the cylindrical body,
wherein the one or more tool engagement features comprise one or more slots, and
wherein the one or more slots have a shape comprising a J-shape, a T-shape, an L-shape, or a combination thereof.

8. The reciprocating element of claim 7, wherein the reciprocating element engagement features of the tool are rotatably lockable with the tool engagement features of the reciprocating element, whereby the reciprocating element can be rotated and pulled and/or rotated and pushed via the tool relative to the central axis of the cylindrical body.

9. The reciprocating element of claim 7, wherein the front end of the cylindrical body comprises a wall having a wall thickness, and wherein the one or more slots extend a depth into the wall that is less than or substantially equal to the wall thickness.

10. The reciprocating element of claim 7, wherein the reciprocating element comprises a plunger or a piston.

11. A reciprocating element manipulation tool comprising:
an actuating end and a reciprocating element end, wherein the reciprocating element end comprises one or more reciprocating element engagement features adapted to engage a corresponding one or more tool engagement features of a reciprocating element, such that the reciprocating element can be rotated, pulled, and pushed via the tool by engaging the tool engagement features of the reciprocating element with the reciprocating element engagement features of the tool such a central axis of the tool and a central axis of the reciprocating element are coaxial and rotating, pushing, and/or pulling the reciprocating element relative to its central axis by correspondingly rotating, pushing, and/or pulling the actuating end of the tool relative to its central axis, wherein the reciprocating element manipulation tool and the reciprocating element each comprise a cylindrical body, wherein the one or more tool engagement features comprise a plurality of slots positioned about an outer circumference of one end of the cylindrical body of the reciprocating element, and wherein the one or more reciprocating element engagement features comprise a plurality of lugs configured to fit into the one or more slots and positioned about an outer circumference of the reciprocating element end of the cylindrical body of the tool.

12. The reciprocating element manipulation tool of claim 11, wherein the actuating end comprises an internal square drive, an external hex, a through hole, or a combination thereof.

13. A method of servicing a wellbore, the method comprising:
fluidly coupling a pump to a source of a wellbore servicing fluid and to the wellbore, wherein the pump comprises: a power end, a pump fluid end, and a reciprocating element, wherein the power end is operable to reciprocate the reciprocating element along a path within a reciprocating element bore of the pump fluid end during operation of the pump, and wherein the reciprocating element comprises:
a cylindrical body having a front end opposite a tail end, and a central axis,
wherein the tail end of the cylindrical body is operatively connected to the power end; and
wherein the front end of the cylindrical body comprises one or more tool engagement features positioned about an outer circumference of the front end of the cylindrical body of the reciprocating element, wherein the one or more tool engagement features are adapted to engage a corresponding one or more reciprocating element engagement features of a reciprocating element end of a tool, during maintaining and/or assembling of the pump, such that the reciprocating element can be rotated, pulled, and pushed via the tool relative to the central axis, wherein the one or more tool engagement features comprise one or more slots, and either
(i) wherein the front end of the cylindrical body comprises a wall having a wall thickness, and wherein the one or more slots extend a depth into the wall that is less than or substantially equal to the wall thickness; or
(ii) wherein the one or more slots have a shape comprising a J-shape, a T-shape, an L-shape, or a combination thereof; or
(iii) both (i) and (ii); and
communicating wellbore servicing fluid into the wellbore via the pump.

14. The method of claim 13 further comprising:
discontinuing the communicating of the wellbore servicing fluid into the wellbore via the pump; and
subjecting the pump to maintenance to provide a maintained pump, wherein subjecting the pump to maintenance comprises:
accessing the reciprocating element bore of the pump fluid end;
removing the reciprocating element from the pump fluid end by rotating and pulling the reciprocating element via the tool;
optionally performing a maintenance on the pump fluid end of the pump, on the reciprocating element, or both; and
positioning the or another reciprocating element within the pump fluid end by rotating and pushing the reciprocating element or the another reciprocating element via the tool relative to the central axis; and
communicating the or another wellbore servicing fluid into the wellbore via the maintained pump.

15. The method of claim 14 comprising performing a maintenance on the pump fluid end of the pump, wherein performing maintenance comprises repacking a reciprocating element packing within the reciprocating element bore; wherein performing a maintenance on the reciprocating element comprises replacing or repairing a suction valve assembly integrated with the reciprocating element; or a combination thereof.

16. The method of claim 14, wherein the wellbore servicing fluid, the another wellbore servicing fluid, or both the wellbore servicing fluid and the another wellbore servicing fluid comprise a fracturing fluid, a cementitious fluid, a remedial fluid, a perforating fluid, a sealant, a drilling fluid, a spacer fluid, a completion fluid, a gravel pack fluid, a gelation fluid, a polymeric fluid, an aqueous fluid, an oleaginous fluid, or a combination thereof.

17. The method of claim 14, wherein the pump or the maintained pump operates during the pumping of the wellbore servicing fluid or the another wellbore servicing fluid at a pressure of greater than or equal to about 3,000 psi, 5,000 psi, 10,000 psi, 20,000 psi, 30,000 psi, 40,000 psi, or 50,000 psi.

18. The method of claim 14, wherein the pump or the maintained pump operates during the pumping of the wellbore servicing fluid or the another wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

19. The reciprocating element of claim 13, wherein the reciprocating element engagement features of the tool are rotatably lockable with the tool engagement features of the reciprocating element, whereby the reciprocating element can be rotated and pulled and/or rotated and pushed via the tool relative to the central axis of the cylindrical body.

* * * * *